(12) United States Patent
Hayes et al.

(10) Patent No.: US 7,548,363 B2
(45) Date of Patent: Jun. 16, 2009

(54) BI-STABLE ELECTROWETTING OPTICAL ELEMENT AND DRIVING METHOD THEREFOR

(75) Inventors: Robert Andrew Hayes, Eindhoven (NL); Romaric Mathieu Massard, Communay (FR); Bokke Johannes Feenstra, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 159 days.

(21) Appl. No.: 11/570,545

(22) PCT Filed: Jun. 14, 2005

(86) PCT No.: PCT/IB2005/051955

§ 371 (c)(1),
(2), (4) Date: Dec. 13, 2006

(87) PCT Pub. No.: WO2006/000945

PCT Pub. Date: Jan. 5, 2006

(65) Prior Publication Data

US 2007/0263306 A1    Nov. 15, 2007

(30) Foreign Application Priority Data

Jun. 23, 2004  (EP) .................................. 04102891

(51) Int. Cl.
*G02F 1/01* (2006.01)

(52) U.S. Cl. ......................... 359/276; 359/253; 359/259
(58) Field of Classification Search ................. 359/276, 359/238, 245, 242, 259, 244, 253
See application file for complete search history.

(56) References Cited

U.S. PATENT DOCUMENTS

| 7,123,796 B2 * | 10/2006 | Steckl et al. .................. 385/40 |
| 7,163,612 B2 * | 1/2007 | Sterling et al. ............. 204/600 |
| 7,180,677 B2 * | 2/2007 | Fujii et al. .................. 359/665 |

FOREIGN PATENT DOCUMENTS

| EP | 0806753 A1 | 11/1997 |
| WO | WO03071347 A1 | 8/2003 |

OTHER PUBLICATIONS

Hayes et al: "Video-Speed Electronic Paper Based on Electrowetting"; Nature, MacMillan Journals Ltd. vol. 425, No. 6956, Sep. 25, 2003, pp. 383-385, XP002286158.

* cited by examiner

Primary Examiner—Timothy J Thompson

(57) ABSTRACT

An optical element used, e.g., in an electrowetting display device having a number of pixels, is arranged in an array. Each optical element includes a cell filled with a polar conductive fluid, such as a water solution, and a non-polar fluid, such as an oil. The cell further includes first and second planar electrodes covered with first and second hydrophobic layers. By applying a voltage between the first fluid and alternately the first or second electrodes, the oil is forced to migrate between the first and second hydrophobic layers. Thus a bi-stable, energy efficient optical element is provided.

9 Claims, 2 Drawing Sheets

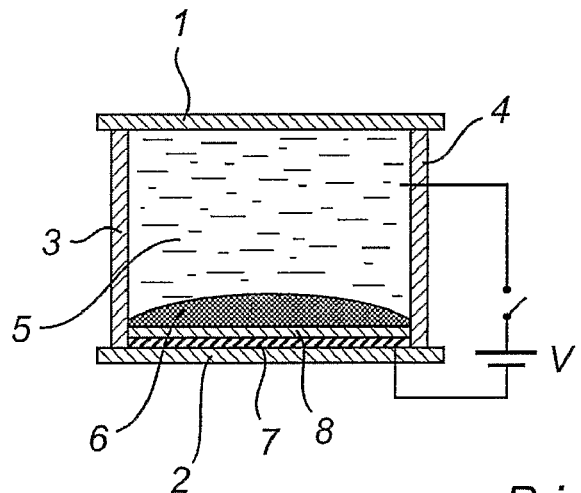
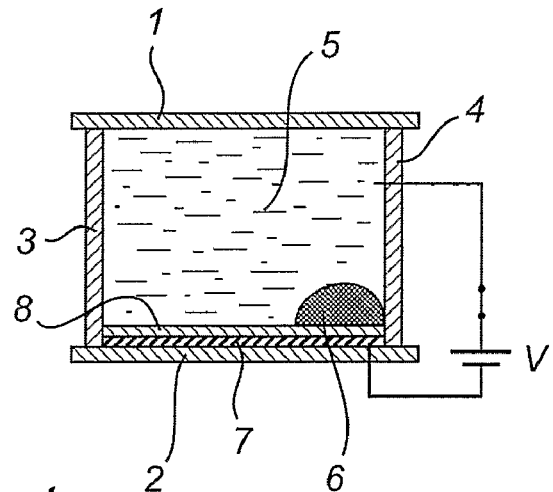
Fig. 1a  *Prior art*  Fig. 1b
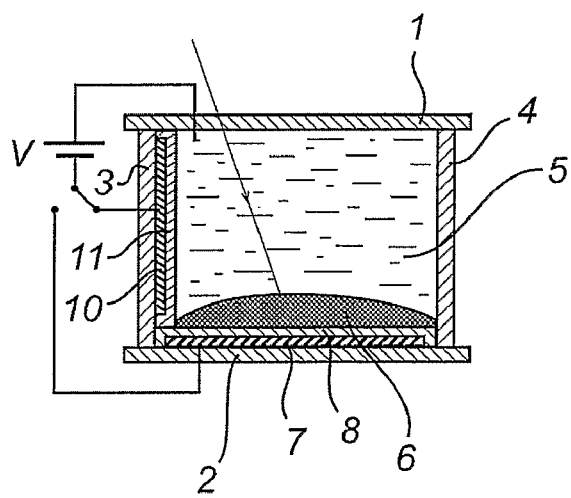
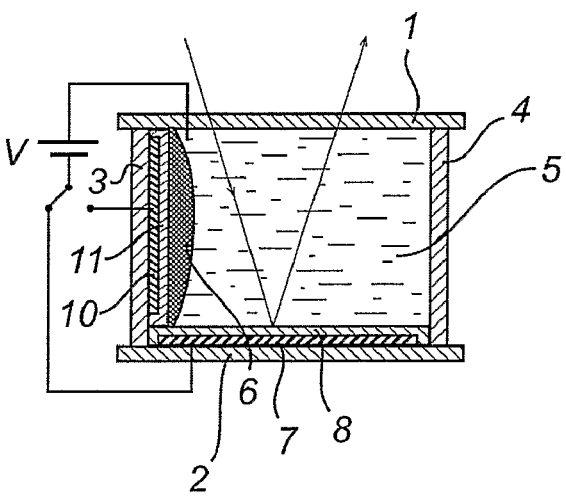
Fig. 2a  Fig. 2b

BI-STABLE ELECTROWETTING OPTICAL ELEMENT AND DRIVING METHOD THEREFOR

FIELD OF THE INVENTION

The present invention relates to an optical element, comprising a closed cell, containing a first fluid and a second fluid, wherein the first fluid is conductive and the second fluid is coloured and immiscible with the first fluid, a first electrode, covered with a first hydrophobic, insulating layer and located at a first wall in the cell, the voltage between the first electrode and the first fluid being controllable in order to control the area of the first hydrophobic layer that contacts the first fluid, and thereby the amount of light that is transmitted through the cell in a direction perpendicular to the first wall.

BACKGROUND OF THE INVENTION

Such an optical element, forming part of a display device, known as an electrowetting display, is disclosed for example in WO, 03/071347, A1. The electrowetting functionality provides a display with excellent brightness and contrast, and a relatively low power consumption compared to many other display technologies. One problem, however, with optical elements of the above mentioned kind is that the power consumption, albeit lower than for optical elements used in many other display arrangements, is still quite high for some applications, demanding a very low power consumption.

SUMMARY OF THE INVENTION

It is therefore an object of the present invention to provide an optical element of the above mentioned kind with improved power consumption characteristics.

More specifically, according to a first aspect, the invention relates to an optical element, comprising a closed cell, containing a first fluid and a second fluid, wherein the first fluid is conductive and the second fluid is coloured and immiscible with the first fluid, a first electrode, covered with a first hydrophobic, insulating layer and located at a first wall in the cell, the voltage between the first electrode and the first fluid being controllable in order to control the area of the first hydrophobic layer that contacts the first fluid, and thereby the amount of light that is transmitted through the cell in a direction perpendicular to the first wall, wherein the cell comprises a second electrode covered by a second hydrophobic, insulating layer, and the optical element comprises means for applying a voltage between the first fluid and, alternately, the first electrode or the second electrode.

This allows the provision of a bi-stable optical element, to which energy must only be provided when the optical element changes state.

In a preferred embodiment, the first electrode is planar and parallel with the first wall, and the second electrode extends substantially perpendicular to the first electrode and preferably adjacent to a second wall of the cell, which is perpendicular to the first wall. In this way the second fluid does not disturb the optical path at all when the optical element is switched on. This results in improved brightness, e.g. in a display.

Preferably the second electrode extends adjacent to more than one wall of the cell, and in a preferred embodiment adjacent to all side walls of the cell that are perpendicular to the first wall. This results, if the optical element is used as a picture element in a display, in a thinner display with improved viewing angle properties.

In a preferred embodiment there is a continuous gap between the first hydrophobic layer and the second hydrophobic layer. This makes the optical element more stable, since the second fluid is not prone to cross the gap and migrate from one hydrophobic layer to the other without the provision of a driving voltage.

Alternatively however, at least one hydrophobic material bridge may be provided between the first hydrophobic layer and the second hydrophobic layer. Such a bridge guides the second fluid in the switching operation, which is hence made more reliable.

Such an element may form part of a switchable diaphragm, a shutter or a colour filter.

According to a second aspect, however, the invention relates to a display device, comprising a plurality of picture elements, wherein each picture element comprises such an optical element. Such a display device provide excellent power consumption characteristics, which is particularly useful in mobile applications.

According to a third aspect, the invention relates to a method for providing driving signals to an optical element, comprising a closed cell, containing a first fluid and a second fluid, wherein the first fluid is conductive and the second fluid is coloured and immiscible with the first fluid, a first electrode, covered with a first hydrophobic, insulating layer and located at a wall in the cell, the voltage between the electrode and the first fluid being controllable in order to control the area of the first hydrophobic layer that contacts the first fluid, and thereby the amount of light that is transmitted through the cell, wherein each cell comprises a second electrode covered by a second hydrophobic, insulating layer, the method comprising the steps of: applying a voltage between the first fluid and the first electrode in order to obtain a first cell transmittance, and applying a voltage between the first fluid and the second electrode in order to obtain a second cell transmittance.

This method provides advantages corresponding to the advantages of the earlier mentioned optical element.

These and other aspects of the invention will be apparent from and elucidated with reference to the embodiments described hereinafter.

BRIEF DESCRIPTION OF THE DRAWINGS

FIGS. 1a and 1b illustrate schematically a cross section through an optical element cell and its working principle in a display device according to prior art.

FIGS. 2a and 2b illustrate schematically an optical element cell, modified in accordance with an embodiment of the invention.

DESCRIPTION OF PREFERRED EMBODIMENTS

Figure 3:
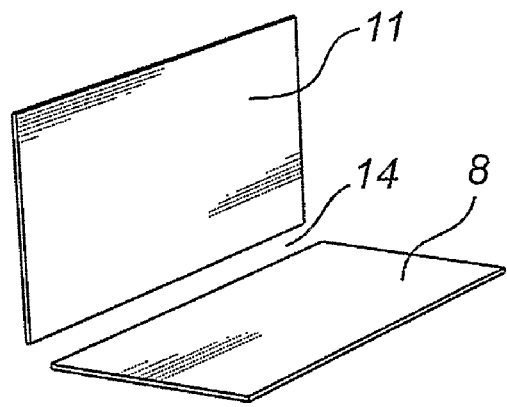
FIG. 3 illustrates hydrophobic insulating layers, arranged in accordance with a first embodiment of the invention.

FIGS. 1a and 1b illustrate schematically a cross section through an optical element cell and its working principle in a display device according to prior art.

Such a display device may comprise a plurality, e.g. 600*400, of picture elements (pixels), arranged in an array. Each picture element comprises an optical element cell, which may preferably be rectangular as seen from a user.

The cell comprises a closed space, which is defined by a transparent front wall 1, facing a user, a back wall 2 and side walls 3, 4. The front and back walls may be common to all pixels.

The cell is filled with a first fluid 5 and a second fluid 6. The first fluid 5 may comprise water containing a salt solution, and the second fluid 6 may consist of an oil, such as a silicone oil or an alkane. The first and second fluids 5, 6 are substantially immiscible, as is the case with water and the above mentioned oils. The first fluid 5 is polar and conductive, whereas the second fluid 6 may be electrically insulating. The second fluid is coloured with a dye or in some cases with a pigment.

A transparent first electrode 7, comprising for instance an ITO layer (ITO=Indium Tin Oxide) is disposed on the back wall 2, and is covered with a hydrophobic insulating layer 8, comprising for instance an amorphous fluoropolymer (e.g. AF1600).

In the relaxed state the second fluid 6, hereinafter called the oil, covers the hydrophobic layer 8, since the first fluid 5, hereinafter called the water, is not prone to wet the hydrophobic layer 8. This is due to the fact that the sum of interfacial tensions between the hydrophobic layer and the oil and between the oil and the water is smaller than the interfacial tension between the water and the hydrophobic insulator. When however a voltage is applied between the transparent electrode 7 and the water 5, the energy balance is changed and the water 5 begins to wet the hydrophobic layer 8, pushing the oil 6 aside to a smaller part of the hydrophobic layer 8, as is illustrated in FIG. 1*b*. No substantial current flows during this process, since the hydrophobic layer is insulating, hence the process is predominantly capacitive. Since the coloured oil 6 is now pushed aside, a greater amount of light may be reflected by the white back wall 2 of the cell. When the voltage is released, the cell returns to the state illustrated in FIG. 1*a*, i.e. the oil 6 again covers substantially all of the hydrophobic layer 8. A number of such cells, arranged in an array, may therefore function as a reflective display device, capable of displaying images to a user by electrically controlling the cells (pixels) in the array.

FIGS. 2*a* and 2*b* illustrate an optical element cell, modified in accordance with an embodiment of the invention. According to this embodiment each cell further comprises a second electrode 10 covered by a second hydrophobic, insulating layer 11.

The display device comprises means for alternately applying voltages between the water 5, which is connected to a circuit, and the first electrode 7 and between the water 5 and the second electrode 10. When a voltage is applied between the water 5 and the second electrode 10, any oil on the second hydrophobic layer 11 is forced to migrate to the first hydrophobic layer 8, covering the first, transparent electrode 7, as illustrated in FIG. 2*a*. In a corresponding manner, when a voltage is applied between the water 5 and the first, transparent electrode 7, any oil on the first hydrophobic layer 8 is forced to migrate to the second hydrophobic layer 11, covering the second electrode 10, as illustrated in FIG. 2*b*. The oil film will typically be less than 50 μm thick.

The electrode to which the voltage is not applied may preferably in each state be earthed.

Thus, a method has been contemplated comprising the steps of: (a) applying a voltage between the first fluid 5 (water) and the first electrode 7 in order to obtain a first cell transmittance, and hence a first pixel appearance, e.g. where the pixel is white, and (b) applying a voltage between the first fluid 5 and the second electrode 10 in order to obtain a second cell transmittance, and hence pixel appearance, e.g. where the pixel is more or less black.

It is to be noted that the provision of the auxiliary arrangement of the second electrode 10 and the second auxiliary layer 11 renders the optical element, e.g. the pixel bi-stable. That is, if the voltage is released, the pixel remains in any of the two states, as compared to the prior art mono-stable arrangement, where a voltage must be supplied constantly or at least at regular intervals (depending on the fluid dynamics) in order to keep the pixel in the "unstable" state.

Thus in the bi-stable arrangement according to an embodiment of the invention, a voltage must only be supplied when a pixel is to make a transition between a first state and a second state (blacks→white or white→black). This of course makes the display device more energy efficient, particularly in applications where pixel content is not often changed.

FIG. 3 illustrates hydrophobic insulating layers, arranged in accordance with a first embodiment of the invention. The first electrode 7 and the first hydrophobic layer 8 are planar and located in the back wall of the cell as seen from a user, watching a display. The second electrode 10 and the second hydrophobic layer 11 then extend substantially perpendicular to plane of the first electrode, and are then arranged at a side wall (3 in FIG. 2*a*).

It should be understood that the first and second electrodes 7, 10 could also be parallel, but the perpendicular arrangement provides the additional advantage of keeping the oil 6 substantially out of the optical path of incoming and reflected light, since the white back wall 2 can be completely uncovered.

As illustrated in FIG. 3 a continuous gap 14 may be provided between the first hydrophobic layer 8 and the second hydrophobic layer 11. This prevents any transport of the oil 6 between the first and second hydrophobic layers 8, 11, when no voltages are applied to the first or second electrodes 7, 10. The bi-stability is thus made more reliable.

Figure 4:
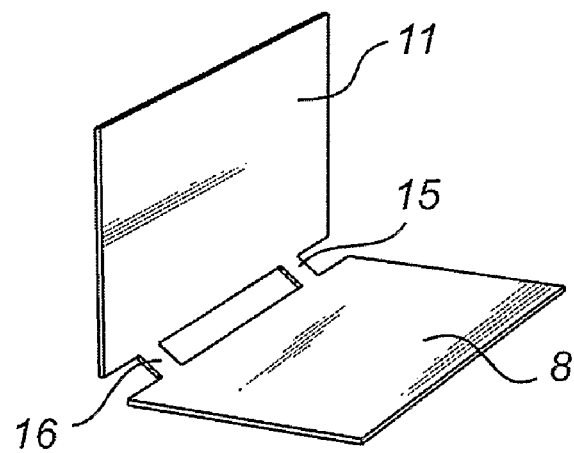
FIG. 4 illustrates hydrophobic insulating layers, arranged in accordance with a second embodiment of the invention.

FIG. 4 illustrates hydrophobic insulating layers, arranged in accordance with a second embodiment of the invention. In this embodiment one or more hydrophobic material bridges 15, 16 are provided, which interrupt the otherwise continuous gap between the first hydrophobic layer 8 and the second hydrophobic layer 11. While such bridges 15, 16 to some extent create a risk of unintentional transport of oil 6 between the first and second hydrophobic layers 8, 11, they also make the switching between the two states more reliable by guiding the oil 6 between the first and second hydrophobic layers 8, 11. This reduces the risk that some or all of the oil 6 unintentionally remains on a hydrophobic layer similar to the situation in FIG. 1*b*.

The width of the bridges 15, 16 should be chosen experimentally to be wide enough to provide the guiding function, but small enough to avoid unintended transport of oil 6 in a relaxed state.

Figure 5:
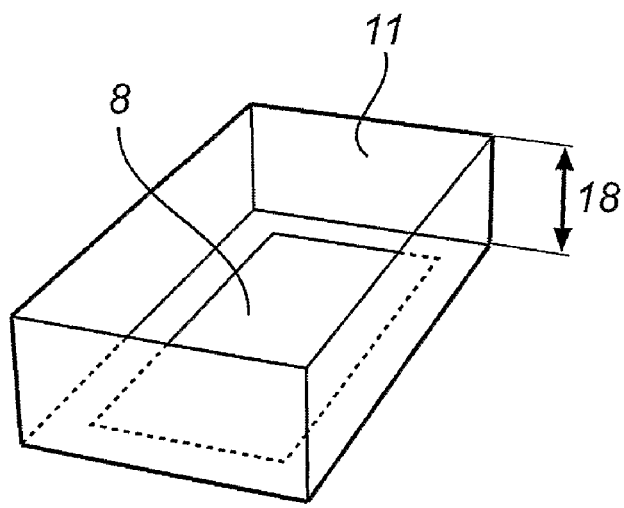
FIG. 5 illustrates hydrophobic insulating layers, arranged in accordance with a third embodiment of the invention.

FIG. 5 illustrates hydrophobic insulating layers, arranged in accordance with a third embodiment of the invention. As illustrated, it is preferred to let the second electrode extend adjacent to more than one side wall of the cell, and even more preferred adjacent to all side walls of the cell. This allows a decreased thickness 18 of the cell even though the total area of the second electrode 10 and the second hydrophobic layer 11 can be retained. The advantage of this is not only a thinner display, when the optical element is used in a display. More important, the viewing angle of the display is improved.

As described above, the optical element is used as a pixels in a display device, comprising a plurality of such optical elements. However, the optical element may also be used in other applications, such as a switchable diaphragm, a shutter or a colour filter.

In summary, the invention relates to an optical element, used e.g. in an electrowetting display device comprising a number of pixels, arranged in an array. Each optical element comprises a cell filled with a polar conductive fluid, such as a water solution, and a non-polar fluid, such as an oil. The cell further comprises first and second planar electrodes, covered with first and second hydrophobic layers. By applying a voltage between on one hand the first fluid and on the second hand alternately the first and second electrode, the oil is forced to migrate between the first and second hydrophobic layers. Thus a bi-stable, energy efficient optical element is provided.

The invention is not restricted to the described embodiment. It can be altered in different ways within the scope of the appended claims. For example even though a reflective display device is illustrated, a backlighted display device may be obtained by providing a backlighting arrangement and replacing the white back wall 2 in FIG. 2a with a transparent back wall.

The invention claimed is:

1. An optical element comprising a closed cell, containing a first fluid and a second fluid, wherein the first fluid is conductive and the second fluid coloured and immiscible with the first fluid, a first electrode, covered with a first hydrophobic, insulating layer and located at a first wall the cell, a voltage between the first electrode and the first fluid being controllable in order to control an area of the first hydrophobic layer that contacts the first fluid, and thereby an amount of light that is transmitted through the cell in a direction perpendicular to the first wall, wherein the cell comprises a second electrode covered by a second hydrophobic, insulating layer, and the optical element comprises means for applying a voltage between the first fluid and, alternately, the first electrode or the second electrode, wherein the first electrode is planar and parallel with the first wall, and wherein the second electrode extends substantially perpendicular to the first electrode.

2. The optical element according to claim 1, wherein the second electrode extends adjacent to a second wall of the cell, which is perpendicular to the first wall.

3. The optical element according to claim 2, wherein the second electrode extends adjacent to more than one wall of the cell, each of said more than one wall being perpendicular to the first wall.

4. The optical element according to claim 3, wherein the second electrode extends adjacent to all walls of the cell that are perpendicular to the first wall.

5. The optical element according to claim 1, wherein there is a continuous gap between the first hydrophobic layer and the second hydrophobic layer.

6. An optical element comprising a closed cell, containing a first fluid and a second fluid, wherein the first fluid is conductive and the second fluid is coloured and immiscible with the first fluid, a first electrode, covered with a first hydrophobic, insulating layer and located at a first wall in the cell, a voltage between the first electrode and the first fluid being controllable in order to control an area of the first hydrophobic layer that contacts the first fluid, and thereby an amount of light that is transmitted through the cell in a direction perpendicular to the first wall, wherein the cell com rises a second electrode covered by a second hydrophobic, insulating layer, and the optical element comprises means for applying a voltage between the first fluid and, alternately, the first electrode or the second electrode, and at least one hydrophobic material bridge between the first hydrophobic layer and the second hydrophobic layer.

7. The optical element according to claim 1, wherein the optical element forms part of a switchable diaphragm, a shutter or a colour filter.

8. A display device, comprising a plurality of picture elements, each picture element comprising an optical element, the optical element comprising a closed cell, containing a first fluid and a second fluid, wherein the first fluid is conductive and the second fluid is coloured and immiscible with the first fluid, a first electrode, covered with a first hydrophobic, insulating layer and located at a first wall in the cell, a voltage between the first electrode and the first fluid being controllable in order to control an area of the first hydrophobic layer that contacts the first fluid, and thereby an amount of light that is transmitted through the cell in a direction perpendicular to the first wall, wherein the cell comprises a second electrode covered by a second hydrophobic, insulating layer, and the optical element comprises means for applying a voltage between the first fluid and, alternately, the first electrode or the second electrode.

9. A method for providing driving signals to an optical element, comprising a closed cell, containing a first fluid and a second fluid, wherein the first fluid is conductive and the second fluid is coloured and immiscible with the first fluid, a first electrode, covered with a first hydrophobic, insulating layer and located at a wall in the cell, the voltage between the first electrode and the first fluid being controllable in order to control the area of the first hydrophobic layer that contacts the first fluid, and thereby the amount of light that is transmitted through the cell, wherein each cell comprises a second electrode covered by a second hydrophobic, insulating layer, the method comprising the acts of:

applying a voltage between the first fluid and the first electrode in order to obtain a first cell transmittance, and applying a voltage between the first fluid and the second electrode in order to obtain a second cell transmittance wherein the first electrode is planar and parallel with the wall, and wherein the second electrode extends substantially perpendicular to the first electrode.

\* \* \* \* \*